G. KEITH.
GAS LAMP.
APPLICATION FILED NOV. 4, 1913.
1,123,887.
Patented Jan. 5, 1915.
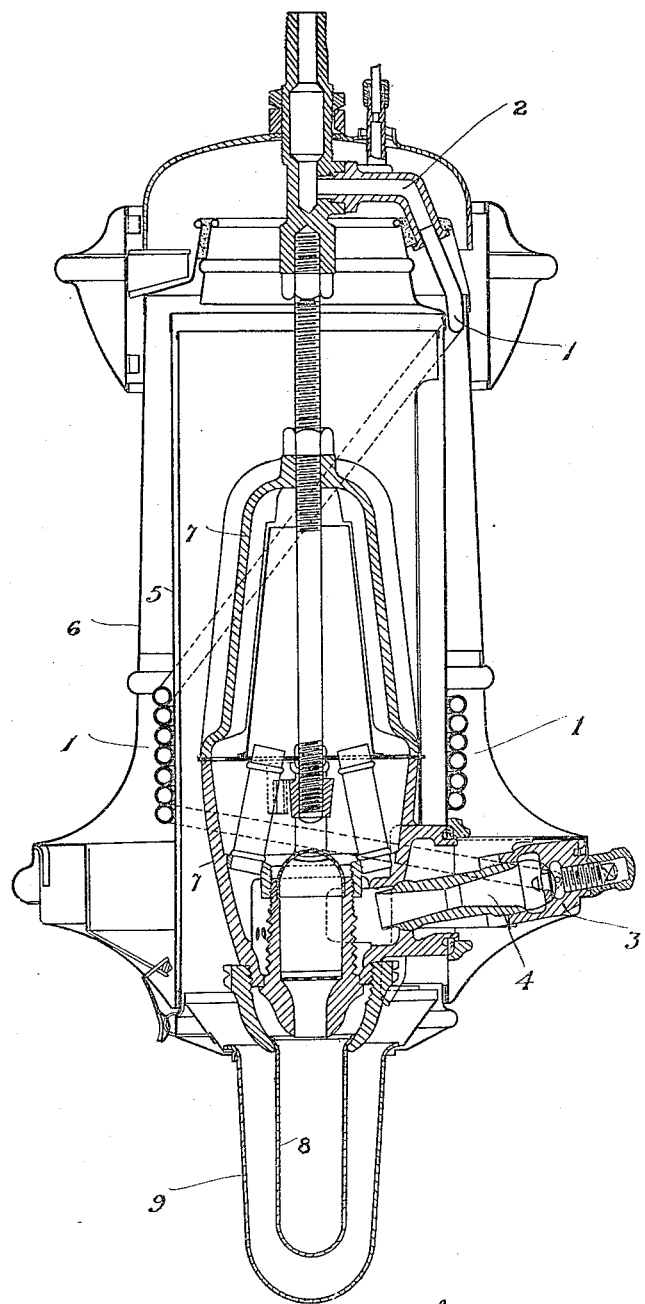

UNITED STATES PATENT OFFICE.

GEORGE KEITH, OF LONDON, ENGLAND, ASSIGNOR OF ONE-HALF TO JAMES KEITH, OF LONDON, ENGLAND.

GAS-LAMP.

1,123,887.   Specification of Letters Patent.   Patented Jan. 5, 1915.

Application filed November 4, 1913. Serial No. 799,085.

*To all whom it may concern:*

Be it known that I, GEORGE KEITH, a subject of the King of the United Kingdom of Great Britain and Ireland, and residing at London, England, have invented a certain new and useful Improvement in Gas-Lamps, of which the following is a specification.

In the use of gas lamps, more especially high pressure incandescent gas lamps fitted with globes of fused silica as described in the specification of the co-pending application No. 737671, it has been found that the globes are liable to be discolored and the gas nipples liable to be choked in consequence of the presence in the gas of traces of certain impurities. Of such impurities carbonyl of iron is particularly troublesome on account of the deposition of iron produced when the volatile carbonyl is heated. Other constituents of the gas or even lubricating oil carried over from the compressors, when these are used, are apt to produce choking of the gas nipples by deposition due to the cold or relatively cold gas coming in intimate contact with the internal walls of the nipples which under ordinary working conditions become very hot by conduction. To free the gas from such impurities and prevent deposition on the nipples besides increasing the injecting effect, I provide for preheating the gas before it reaches the nipple, *i. e.*, before it is joined by the stream of air with which it forms a self-burning mixture the volume of which is considerably greater than the volume of gas passing through the nipple rendering it more difficult to separate the impurities after the addition of air than before; that is, by preheating the gas to an adequate temperature I insure that the iron, etc., will be deposited in the heating apparatus before the gas reaches the nipple and also provide that a hot stream of gas shall pass through the nipple, the gas when heated being able to induce a larger volume of air than if the same quantity of cold or relatively cold gas working at the same pressure were used.

The figure of the accompanying drawing is a longitudinal vertical section of a high pressure inverted incandescent gas lamp equipped with the present improvements.

Referring to the drawing, 1 is a tube constituting the heater for the gas while still unmixed with air, said tube being connected at its upper end to the gas inlet pipe 2 and at its lower end to the nipple 3 of the injector tube 4. The tube 1 is in part formed as a coil disposed between the inner casing 5 and the outer casing 6 of the lamp structure and in thermal contact with the inner casing 5, so that a proportion of the waste heat from the lamp may pass through said inner casing 5 to said coil, heating the gas in its passage through said coil. The interior of the tube presents a large surface in relation to the cubical capacity of the tube so that the tube forms an efficient heater for the gas.

The temperature to which the gas is brought within the coil is not so high as to occasion deposit of carbon, but is sufficient to insure adequate purification of the gas and also considerable increase of the injecting effect.

It will be understood that the gas flowing through the nipple 3 will induce a current of combustion-supporting air to flow through the injector tube 4, the mixture of gas and air being passed through a heater 7 and thence led to the interior of the mantle 8 where combustion takes place.

As shown the mantle 8 is surrounded by a closely fitting globe 9 composed of fused silica which is highly susceptible to the action of the impurities removed from the gas by its passage through the coil. Apart from considerations arising from the relative susceptibility of highly heated fused silica and relatively cold glass to the action of the impurities in question, the globe 9 being of such small dimensions as to be located within a field of temperature destructive of glass and being closed against ingress of secondary air, is of course more liable to collect and be obscured by impurities than the usual form of glass globe of large dimensions having an opening at its lower end.

I claim:—

In a gas lamp, in combination, a lamp structure comprising an outer and an inner casing, an injector comprising a nipple and an injector tube through which air is induced to flow by a stream of gas passing through said nipple, part of said injector tube being contained within the inner casing and the remainder within the outer casing, a gas supply tube including a coiled portion connected to said nipple, said tube being in thermal contact with the inner casing and located wholly within the outer casing and out of the path of the combustion products, and a heater for the mixture of gas and air located wholly within the inner casing in the path of the combustion products and in communication with said injector tube.

In testimony whereof I have signed my name to this specification in the presence of two subscribing witnesses.

GEORGE KEITH.

Witnesses:
M. BURMINGHAM,
W. P. HAMPSHIRE.

Copies of this patent may be obtained for five cents each, by addressing the "Commissioner of Patents, Washington, D. C."